United States Patent
Son et al.

(10) Patent No.: US 9,822,872 B2
(45) Date of Patent: Nov. 21, 2017

(54) HYDRAULIC CONTROL SYSTEM FOR AUTOMATIC TRANSMISSION OF VEHICLE

(71) Applicants: HYUNDAI MOTOR COMPANY, Seoul (KR); KIA MOTORS CORPORATION, Seoul (KR)

(72) Inventors: Hyunjun Son, Seoul (KR); Sung Hoon Park, Seongnam-si (KR); Joo Hang Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/223,344

(22) Filed: Jul. 29, 2016

(65) Prior Publication Data

US 2017/0159806 A1    Jun. 8, 2017

(30) Foreign Application Priority Data

Dec. 8, 2015  (KR) .......................... 10-2015-0174190

(51) Int. Cl.
  *F16H 61/12*  (2010.01)
  *F16H 61/00*  (2006.01)
  (Continued)

(52) U.S. Cl.
  CPC ......... *F16H 61/12* (2013.01); *F16H 61/0021* (2013.01); *F16H 61/0204* (2013.01);
  (Continued)

(58) Field of Classification Search
  None
  See application file for complete search history.

(56) References Cited

U.S. PATENT DOCUMENTS 6,302,822 B1 *  10/2001  Suzuki .................... F16H 61/12
                                                         477/143
6,712,725 B2 *   3/2004  Uchino ............... F16H 61/0246
                                                         475/119

(Continued)

FOREIGN PATENT DOCUMENTS

JP    2015-068482 A   4/2015
JP    2015-113857 A   6/2015
(Continued)

*Primary Examiner* — Justin Holmes
(74) *Attorney, Agent, or Firm* — McDermott Will & Emery LLP

(57) ABSTRACT

A hydraulic control system of an automatic transmission may be applied to an automatic transmission in which a reverse speed stage is engaged by engagement of first and second friction elements. The hydraulic control system may include: a first solenoid valve being a normally open type and controlling a line pressure to generate a first hydraulic pressure; a second solenoid valve being a normally closed type and controlling the line pressure to generate a second hydraulic pressure; first and second switch valves, the first switch valve selectively supplying the first hydraulic pressure to the second switch valve; and a fail-safe valve selectively supplying the first hydraulic pressure or the second hydraulic pressure to the second friction element, wherein the second switch valve selectively supplies the first hydraulic pressure supplied from the first switch valve or a reverse speed pressure to the first friction element.

14 Claims, 2 Drawing Sheets

(51) Int. Cl.
*F16H 61/02* (2006.01)
*F16K 11/07* (2006.01)
*F16K 31/06* (2006.01)

(52) U.S. Cl.
CPC .......... *F16H 61/0251* (2013.01); *F16K 11/07* (2013.01); *F16K 31/06* (2013.01); *F16H 2061/0253* (2013.01); *F16H 2061/1252* (2013.01)

(56) References Cited

U.S. PATENT DOCUMENTS

2002/0035001 A1* 3/2002 Takahashi .......... F16H 61/0206
 475/131
2005/0266959 A1* 12/2005 Nozaki .................. F16H 61/12
 477/130

FOREIGN PATENT DOCUMENTS

| | | |
|---|---|---|
| JP | 2015-124843 A | 7/2015 |
| JP | 2016-217434 A | 12/2016 |
| KR | 10-0932311 B1 | 12/2009 |
| KR | 10-2014-0139228 A | 12/2014 |
| KR | 10-2015-0003933 A | 1/2015 |

* cited by examiner

HYDRAULIC CONTROL SYSTEM FOR AUTOMATIC TRANSMISSION OF VEHICLE

CROSS-REFERENCE TO RELATED APPLICATION

This application claims the benefit of priority to Korean Patent Application No. 10-2015-0174190, filed in the Korean Intellectual Property Office on Dec. 8, 2015, the entirety of which is incorporated herein by reference.

TECHNICAL FIELD

The present disclosure relates to a hydraulic control system for an automatic transmission of a vehicle. More particularly, the present disclosure relates to a hydraulic control system of an automatic transmission for a vehicle that enables the vehicle to be driven at a reverse speed stage when the automatic transmission fails.

BACKGROUND

An automatic transmission of a vehicle may include a torque converter, a planetary gear train connected to the torque converter that functions as a multi-speed mechanism, and a hydraulic control system for operating any one operation element among operation elements of the planetary gear train according to a running state of the vehicle.

The automatic transmission may include the planetary gear train including a compound planetary gear set formed by combining at least two simple planetary gear sets to achieve required multiple speed stages and a plurality of friction elements, and the hydraulic control system may selectively operate the friction elements of the planetary gear train according to a driving condition.

Various solenoid valves are used in the hydraulic control system and suppress electric consumption when a vehicle runs. In order to prevent undesired friction elements from being engaged when the automatic transmission is out of order (fails), solenoid valves of normally closed type are used.

A normally closed type solenoid valve is a solenoid valve configured not to output hydraulic pressure when current is not applied to the solenoid valve.

In further detail, current is applied to a necessary solenoid valve and hydraulic pressure is supplied to friction elements necessary to achieve forward speed stages or reverse speed stages when a shift range is changed to a forward range or a reverse range by means of manipulation of a shift lever.

However, current is not applied to the solenoid valve and the reverse speed stage is not achieved when the hydraulic control system is out of order even though shifting to the reverse speed stage is demanded.

Disconnections, short circuits, and failures of shift range sensor (in this case, a shift range cannot be detected and it cannot be determined which solenoid valve current is applied to) are examples of failures where the current is not applied to corresponding solenoid valves.

For preventing operation of undesired friction elements, the hydraulic control system is designed to enter a solenoid all off failure mode when the automatic transmission fails. In the solenoid all off failure mode, current is not applied to any one of the solenoid valves of the hydraulic control system.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a hydraulic control system of an automatic transmission for a vehicle having advantages of engaging a reverse speed stage if a shift lever is moved to a reverse range even though current is not applied to a solenoid valve, thereby enabling the reverse speed stage to be engaged even during a failure state.

A hydraulic control system of an automatic transmission according to exemplary embodiments in the present disclosure may be applied to an automatic transmission in which a reverse speed stage is engaged by engagement of first and second friction elements.

In various exemplary embodiments, the hydraulic control system may include: a first solenoid valve being a normally open type and controlling a line pressure to generate a first hydraulic pressure; a second solenoid valve being a normally closed type and controlling the line pressure to generate a second hydraulic pressure; first and second switch valves, the first switch valve selectively supplying the first hydraulic pressure to the second switch valve; and a fail-safe valve selectively supplying the first hydraulic pressure or the second hydraulic pressure to the second friction element, wherein the second switch valve selectively supplies the first hydraulic pressure supplied from the first switch valve or a reverse speed pressure to the first friction element, and wherein the fail-safe valve is configured to supply the second hydraulic pressure to the second friction element at a normal state and to supply the first hydraulic pressure to the second friction element at a fail state.

The first switch valve may be controlled by a control pressure of an on/off solenoid valve, and may supply the first hydraulic pressure to the second switch valve when the control pressure of the on/off solenoid valve is input thereinto.

The fail-safe valve may be controlled by a control pressure of an on/off solenoid valve and the reverse speed pressure counteracting against the control pressure of the on/off solenoid valve, may supply the second hydraulic pressure to the second friction element when the control pressure of the on/off solenoid valve is input thereinto, and may supply the first hydraulic pressure to the second friction element when the control pressure of the on/off solenoid valve is not input.

The fail-safe valve may include a valve body and a valve spool movable in the valve body, the valve body may include a first port receiving the control pressure of the on/off solenoid valve, a second port positioned at an opposite side from the first port and receiving the reverse speed pressure as a control pressure, a third port receiving the first hydraulic pressure, a fourth port receiving the second hydraulic pressure, and a fifth port selectively communicating with the third port or the fourth port according to the control pressure of the on/off solenoid valve and the reverse speed pressure, and the valve spool may include a first land on which the control pressure supplied to the first port is exerted and selectively closing or opening the third port, and a second land on which the reverse speed pressure supplied to the second port is exerted and selectively closing or opening the fourth port.

The valve spool may communicate the fourth port with the fifth port when only the control pressure of the on/off solenoid valve is supplied or both of the control pressure of the on/off solenoid valve and the reverse speed pressure are supplied, and may communicate the third port with the fifth port when only the reverse speed pressure is supplied.

The hydraulic control system may further include a 3-way valve supplying a portion of the hydraulic pressure supplied to the second friction element as a control pressure of the second switch valve.

The second switch valve may be controlled by the control pressure of the on/off solenoid valve and the control pressure of the 3-way valve counteracting against the control pressure of the on/off solenoid valve, may supply the reverse speed pressure to the first friction element when both of the control pressure of the on/off solenoid valve and the control pressure of the 3-way valve are input or only the control pressure of the 3-way valve is input, and may supply the first hydraulic pressure supplied from the first switch valve to the first friction element when only the control pressure of the on/off solenoid valve is input.

In various exemplary embodiments, the hydraulic control system may include: a first solenoid valve being a normally open type and controlling a line pressure to generate a first hydraulic pressure; a second solenoid valve being a normally closed type and controlling the line pressure to generate a second hydraulic pressure; first and second switch valves, the first switch valve selectively supplying the first hydraulic pressure to the second switch valve; and a fail-safe valve selectively supplying the first hydraulic pressure or the second hydraulic pressure to the second friction element, wherein the second switch valve selectively supplying the first hydraulic pressure supplied from the first switch valve or a reverse speed pressure to the first friction element, the reverse speed pressure is supplied to the first friction element and the second hydraulic pressure is supplied to the second friction element in a reverse speed stage in a normal state, and the reverse speed pressure is supplied to the first friction element and the first hydraulic pressure is supplied to the second friction element in the reverse speed stage in a failure state.

The first switch valve may be controlled by a control pressure of an on/off solenoid valve, and may supply the first hydraulic pressure to the second switch valve when the control pressure of the on/off solenoid valve is input thereinto.

The fail-safe valve may be controlled by a control pressure of an on/off solenoid valve and the reverse speed pressure counteracting against the control pressure of the on/off solenoid valve, may supply the second hydraulic pressure to the second friction element when the control pressure of the on/off solenoid valve is input thereinto, and may supply the first hydraulic pressure to the second friction element when the control pressure of the on/off solenoid valve is not input.

The fail-safe valve may include a valve body and a valve spool movable in the valve body, the valve body may include a first port receiving the control pressure of the on/off solenoid valve, a second port positioned at an opposite side from the first port and receiving the reverse speed pressure as a control pressure, a third port receiving the first hydraulic pressure, a fourth port receiving the second hydraulic pressure, and a fifth port selectively communicating with the third port or the fourth port according to the control pressure of the on/off solenoid valve and the reverse speed pressure, and the valve spool may include a first land on which the control pressure supplied to the first port is exerted and selectively closing or opening the third port, and a second land on which the reverse speed pressure supplied to the second port is exerted and selectively closing or opening the fourth port.

The valve spool may communicate the fourth port with the fifth port when only the control pressure of the on/off solenoid valve is supplied or both of the control pressure of the on/off solenoid valve and the reverse speed pressure are supplied, and may communicate the third port with the fifth port when only the reverse speed pressure is supplied.

The hydraulic control system may further include a 3-way valve supplying a portion of the hydraulic pressure supplied to the second friction element as a control pressure of the second switch valve.

The second switch valve may be controlled by the control pressure of the on/off solenoid valve and the control pressure of the 3-way valve counteracting against the control pressure of the on/off solenoid valve, may supply the reverse speed pressure to the first friction element when both of the control pressure of the on/off solenoid valve and the control pressure of the 3-way valve are input or only the control pressure of the 3-way valve is input, and may supply the first hydraulic pressure supplied from the first switch valve to the first friction element when only the control pressure of the on/off solenoid valve is input.

The exemplary embodiments in the present disclosure may engage a reverse speed stage if a shift lever is moved to a reverse range even though current is not applied to a solenoid valve engaging the reverse speed stage in a failure state.

Other effects obtainable or predictable from the exemplary embodiment of the present invention will be explicitly or implicitly described in the DETAILED DESCRIPTION section. That is, various effects predictable from exemplary embodiments of the present invention will be described in the DETAILED DESCRIPTION section.

DETAILED DESCRIPTION OF THE EMBODIMENTS

Figure 1:
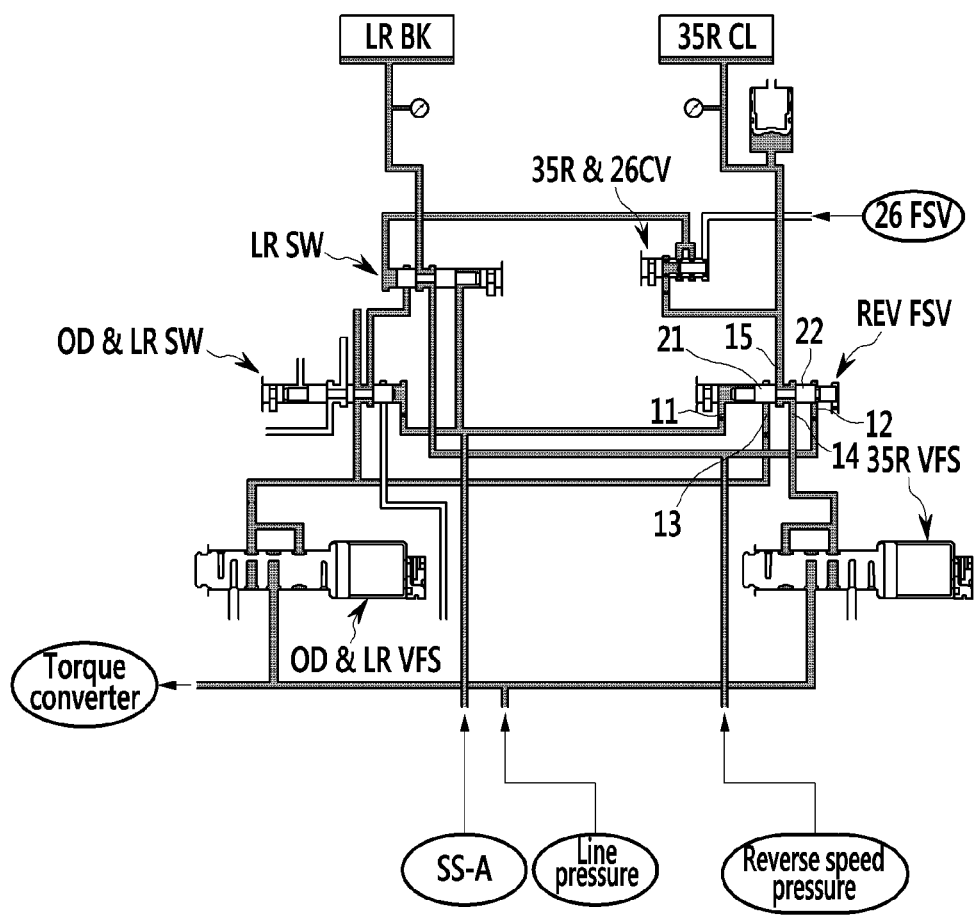
FIG. 1 is a schematic diagram of a hydraulic control system of an automatic transmission according to an exemplary embodiment in the present disclosure in a reverse speed stage in a normal state.

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

Parts which are not related with the description are omitted for clearly describing the exemplary embodiments and like reference numerals refer to like or similar elements throughout the specification.

In the following description, dividing names of components into first, second and the like is to divide the names because the names of the components are the same as each other and an order thereof is not particularly limited.

FIG. 1 is a schematic diagram of a hydraulic control system of an automatic transmission according to an exemplary embodiment in the present disclosure in a reverse speed stage in a normal state.

For convenience of explanation, a number of spool valves and solenoid valves for achieving a reverse speed stage in a hydraulic control system are illustrated in FIG. 1. Explanation of spool valves and solenoid valves that are illustrated in FIG. 1 but are not related to the reverse speed stage will be omitted.

Referring to FIG. 1, one brake LR BK (first friction element) and one clutch 35R CL (second friction element) are operated at a reverse speed stage.

In order to supply hydraulic pressure to the brake LR BK and the clutch 35R CL, two solenoid valves OD & LR VFS and 35R VFS, two switch valves OD & LR SW and LR SW, a fail-safe valve REV FSV, and one 3-way valve 35R & 26 CV may be employed.

The first solenoid valve OD & LR VFS is a normally open type and controls a line pressure supplied from a regulator valve to supply the controlled line pressure to the first switch valve OD & LR SW and the fail-safe valve REV FSV. Herein, a normally open type solenoid valve is a solenoid valve that outputs a hydraulic pressure if current is not applied and does not output the hydraulic pressure if current is applied.

The second solenoid valve 35R VFS is a normally closed type and controls the line pressure supplied from the regulator valve to supply the controlled line pressure to the fail-safe valve REV FSV.

The first switch valve OD & LR SW switches hydraulic lines by a control pressure of an on/off solenoid valve SS-A to supply the hydraulic pressure supplied from the first solenoid valve OD & LR VFS to the second switch valve LR SW or to another friction element (not shown).

The fail-safe valve REV FSV switches hydraulic lines by the control pressure of the on/off solenoid valve SS-A and a reverse speed pressure counteracting against the control pressure of the on/off solenoid valve SS-A to supply the hydraulic pressure supplied from the first solenoid valve OD & LR VFS or the hydraulic pressure supplied from the second solenoid valve 35R VFS to the clutch 35R CL.

In addition, the fail-safe valve REV FSV is a spool valve and includes a valve body and a valve spool moving in the valve body in a length direction of the valve body and switching hydraulic lines.

The valve body of the fail-safe valve REV FSV includes a first port 11 receiving the control pressure of the on/off solenoid valve SS-A, a second port 12 positioned at an opposite side of the first port 11 and receiving the reverse speed pressure as a control pressure, a third port 13 receiving the hydraulic pressure from the first solenoid valve OD & LR VFS, a fourth port 14 receiving the hydraulic pressure from the second solenoid valve 35R VFS, and a fifth port 15 selectively supplying the hydraulic pressure supplied from the third port 13 or the fourth port 14 to the clutch 35R CL.

In addition, the valve spool mounted in the valve body includes a first land 21 on which the hydraulic pressure supplied to the first port 11 is exerted and selectively closing or opening the third port 13, and a second land 22 on which the hydraulic pressure supplied to the second port 12 is exerted and selectively closing or opening the fourth port 14.

Therefore, if the valve spool moves to the right in the drawing, the fourth port 14 is communicated with the fifth port 15 and the fail-safe valve REV FSV supplies the hydraulic pressure supplied from the second solenoid valve 35R VFS to the clutch 35R CL. On the contrary, if the valve spool moves to the left in the drawing, the third port 13 is communicated with the fifth port 15 and the fail-safe valve REV FSV supplies the hydraulic pressure supplied from the first solenoid valve OD & LR VFS to the clutch 35R CL.

At this time, since an area of the first land 21 on which a hydraulic pressure is exerted is greater than an area of the second land 22 on which a hydraulic pressure is exerted in the fail-safe valve REV FSV, the valve spool maintains its right position in the drawing when the control pressure is simultaneously supplied to the first and second ports 11 and 12.

The second switch valve LR SW switches hydraulic lines by the control pressure of the on/off solenoid valve SS-A and a control pressure of the 3-way valve 35R & 26 CV counteracting against the control pressure of the on/off solenoid valve SS-A to selectively supply the hydraulic pressure supplied from the first switch valve OD & LR SW or the reverse speed pressure to the brake LR BK. If the control pressure of the on/off solenoid valve SS-A and the control pressure of the 3-way valve 35R & 26 CV are simultaneously input to the second switch valve LR SW or the control pressure of the 3-way valve 35R & 26 CV is input to the second switch valve LR SW, the second switch valve LR SW supplies the reverse speed pressure to the brake LR BK. On the contrary, if only the control pressure of the on/off solenoid valve SS-A is input to the second switch valve LR SW, the second switch valve LR SW supplies the hydraulic pressure supplied from the first switch valve OD & LR SW to the brake LR BK.

The 3-way valve 35R & 26 CV supplies a portion of the hydraulic pressure supplied to the clutch 35R CL to the second switch valve LR SW as a control pressure, or supplies a portion of a hydraulic pressure supplied from a fail-safe valve 26 FSV to another clutch to the second switch valve LR SW as a control pressure.

Therefore, the reverse speed pressure is supplied to the brake LR BK and the hydraulic pressure controlled by the second solenoid valve 35R VFS is supplied to the clutch 35R CL at a reverse speed stage in a normal state.

Figure 2:
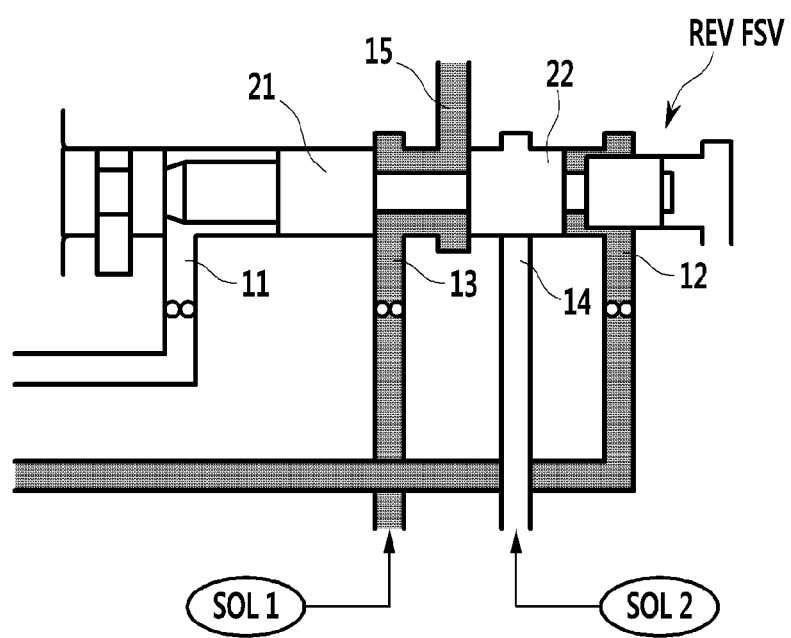
FIG. 2 illustrates operation of a fail-safe valve applied to a hydraulic control system of an automatic transmission according to an exemplary embodiment in the present disclosure in a failure state.

FIG. 2 illustrates operation of a fail-safe valve applied to a hydraulic control system of an automatic transmission according to an exemplary embodiment in the present disclosure in a failure state.

In the failure state, in order to prevent operation of undesired friction elements in the automatic transmission, current is not applied to any one of the solenoid valves. In this state, since the on/off solenoid valve SS-A is a normally closed type, the hydraulic pressure is not output. Therefore, the hydraulic pressure that was supplied to the first switch valve OD & LR SW, the second switch valve LR SW, and the fail-safe valve REV FSV as the control pressure is not supplied.

Therefore, as shown in FIG. 2, the control pressure that was supplied to the first port 11 by the on/off solenoid valve SS-A of normally closed type and the hydraulic pressure that was supplied to the fourth port 14 by the second solenoid valve 35R VFS of normally closed type are not present in the fail-safe valve REV FSV.

In addition, the hydraulic pressure is continuously supplied to the third port 13 by the first solenoid valve OD & LR VFS of normally open type.

In this case, since the reverse speed pressure is supplied to the second port 12 as the control pressure, the valve spool of the fail-safe valve REV FSV moves to the left in the drawing and the third port 13 is communicated with the fifth port 15. Therefore, the hydraulic pressure supplied from the first solenoid valve OD & LR VFS is supplied to the clutch 35R CL through the fail-safe valve REV FSV. In addition, the portion of the hydraulic pressure supplied to the clutch 35R CL is supplied from the 3-way valve 35R & 26 CV to the second switch valve LR SW as the control pressure, and the reverse speed pressure is supplied to the brake LR BK. Therefore, the reverse speed stage is achieved and a vehicle can be driven in the reverse speed stage.

The hydraulic control system of an automatic transmission for a vehicle according to the exemplary embodiment in the present disclosure may engage a reverse speed stage if a shift lever is moved to a reverse range even though current is not applied to a solenoid valve thereby engaging the reverse speed stage in a failure state.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of an automatic transmission in which a reverse speed stage is engaged by engagement of first and second friction elements, the hydraulic control system comprising:
   a first solenoid valve being a normally open type and controlling a line pressure to generate a first hydraulic pressure;
   a second solenoid valve being a normally closed type and controlling the line pressure to generate a second hydraulic pressure;
   first and second switch valves, the first switch valve selectively supplying the first hydraulic pressure to the second switch valve; and
   a fail-safe valve selectively supplying the first hydraulic pressure or the second hydraulic pressure to the second friction element,
   wherein the second switch valve selectively supplies the first hydraulic pressure supplied from the first switch valve or a reverse speed pressure to the first friction element, and
   the fail-safe valve is configured to supply the second hydraulic pressure to the second friction element in a normal state and to supply the first hydraulic pressure to the second friction element in a failure state.

2. The hydraulic control system of claim 1, wherein the first switch valve is controlled by a control pressure of an on/off solenoid valve, and supplies the first hydraulic pressure to the second switch valve when the control pressure of the on/off solenoid valve is input thereinto.

3. The hydraulic control system of claim 1, wherein the fail-safe valve is controlled by a control pressure of an on/off solenoid valve and the reverse speed pressure counteracting against the control pressure of the on/off solenoid valve, supplies the second hydraulic pressure to the second friction element when the control pressure of the on/off solenoid valve is input thereinto, and supplies the first hydraulic pressure to the second friction element when the control pressure of the on/off solenoid valve is not input.

4. The hydraulic control system of claim 3, wherein the fail-safe valve includes a valve body and a valve spool movable in the valve body,
   the valve body includes a first port receiving the control pressure of the on/off solenoid valve, a second port positioned at an opposite side from the first port and receiving the reverse speed pressure as a control pressure, a third port receiving the first hydraulic pressure, a fourth port receiving the second hydraulic pressure, and a fifth port selectively communicating with the third port or the fourth port according to the control pressure of the on/off solenoid valve and the reverse speed pressure, and
   the valve spool includes a first land on which the control pressure supplied to the first port is exerted and selectively closing or opening the third port, and a second land on which the reverse speed pressure supplied to the second port is exerted and selectively closing or opening the fourth port.

5. The hydraulic system of claim 4, wherein the valve spool communicates the fourth port with the fifth port when only the control pressure of the on/off solenoid valve is supplied or both of the control pressure of the on/off solenoid valve and the reverse speed pressure are supplied, and communicates the third port with the fifth port when only the reverse speed pressure is supplied.

6. The hydraulic control system of claim 1, further comprising a 3-way valve supplying a portion of the hydraulic pressure supplied to the second friction element as a control pressure of the second switch valve.

7. The hydraulic control system of claim 6, wherein the second switch valve is controlled by the control pressure of the on/off solenoid valve and the control pressure of the 3-way valve counteracting against the control pressure of the on/off solenoid valve, supplies the reverse speed pressure to the first friction element when both of the control pressure of the on/off solenoid valve and the control pressure of the 3-way valve are input or only the control pressure of the 3-way valve is input, and supplies the first hydraulic pressure supplied from the first switch valve to the first friction element when only the control pressure of the on/off solenoid valve is input.

8. A hydraulic control system of an automatic transmission in which a reverse speed stage is engaged by engagement of first and second friction elements, the hydraulic control system comprising:
   a first solenoid valve being a normally open type and controlling a line pressure to generate a first hydraulic pressure;
   a second solenoid valve being a normally closed type and controlling the line pressure to generate a second hydraulic pressure;
   first and second switch valves, the first switch valve selectively supplying the first hydraulic pressure to the second switch valve; and
   a fail-safe valve selectively supplying the first hydraulic pressure or the second hydraulic pressure to the second friction element,
   wherein the second switch valve selectively supplies the first hydraulic pressure supplied from the first switch valve or a reverse speed pressure to the first friction element,
   the reverse speed pressure is supplied to the first friction element and the second hydraulic pressure is supplied to the second friction element in a reverse speed stage in a normal state, and
   the reverse speed pressure is supplied to the first friction element and the first hydraulic pressure is supplied to the second friction element in the reverse speed stage in a failure state.

9. The hydraulic control system of claim 8, wherein the first switch valve is controlled by a control pressure of an on/off solenoid valve, and supplies the first hydraulic pressure to the second switch valve when the control pressure of the on/off solenoid valve is input thereinto.

10. The hydraulic control system of claim 8, wherein the fail-safe valve is controlled by a control pressure of an on/off solenoid valve and the reverse speed pressure counteracting against the control pressure of the on/off solenoid valve, supplies the second hydraulic pressure to the second friction element when the control pressure of the on/off solenoid valve is input thereinto, and supplies the first hydraulic pressure to the second friction element when the control pressure of the on/off solenoid valve is not input.

11. The hydraulic control system of claim 10, wherein the fail-safe valve includes a valve body and a valve spool movable in the valve body, the valve body includes a first port receiving the control pressure of the on/off solenoid valve, a second port positioned at an opposite side from the first port and receiving the reverse speed pressure as a control pressure, a third port receiving the first hydraulic pressure, a fourth port receiving the second hydraulic pressure, and a fifth port selectively communicating with the third port or the fourth port according to the control pressure of the on/off solenoid valve and the reverse speed pressure, and the valve spool includes a first land on which the control pressure supplied to the first port is exerted and selectively closing or opening the third port, and a second land on which the reverse speed pressure supplied to the second port is exerted and selectively closing or opening the fourth port.

12. The hydraulic control system of claim 11, wherein the valve spool communicates the fourth port with the fifth port when only the control pressure of the on/off solenoid valve is supplied or both of the control pressure of the on/off solenoid valve and the reverse speed pressure are supplied, and communicates the third port with the fifth port when only the reverse speed pressure is supplied.

13. The hydraulic control system of claim 8, further comprising a 3-way valve supplying a portion of the hydraulic pressure supplied to the second friction element as a control pressure of the second switch valve.

14. The hydraulic control system of claim 13, wherein the second switch valve is controlled by the control pressure of the on/off solenoid valve and the control pressure of the 3-way valve counteracting against the control pressure of the on/off solenoid valve, supplies the reverse speed pressure to the first friction element when both of the control pressure of the on/off solenoid valve and the control pressure of the 3-way valve are input or only the control pressure of the 3-way valve is input, and supplies the first hydraulic pressure supplied from the first switch valve to the first friction element when only the control pressure of the on/off solenoid valve is input.

* * * * *